(12) United States Patent
Grassia et al.

(10) Patent No.: US 9,744,739 B2
(45) Date of Patent: Aug. 29, 2017

(54) TAMPING AUGUR

(71) Applicant: Breville Pty Limited, Alexandria (AU)

(72) Inventors: Robert Grassia, Summer Hill (AU);
Richard Hoare, Lane Cove (AU)

(73) Assignee: BREVILLE PTY LIMITED,
Alexandria, NSW (AU)

( * ) Notice: Subject to any disclaimer, the term of this patent is extended or adjusted under 35 U.S.C. 154(b) by 0 days.

(21) Appl. No.: 14/997,988

(22) Filed: Jan. 18, 2016

(65) Prior Publication Data

US 2016/0128507 A1     May 12, 2016

Related U.S. Application Data

(62) Division of application No. 13/821,993, filed on Mar. 11, 2013, now Pat. No. 9,301,637.

(51) Int. Cl.
| | |
|---|---|
| *A47J 31/00* | (2006.01) |
| *B30B 15/14* | (2006.01) |
| *A47J 31/42* | (2006.01) |
| *A47J 31/44* | (2006.01) |
| *A47J 42/40* | (2006.01) |
| *B30B 15/06* | (2006.01) |
| *A47J 31/06* | (2006.01) |

(52) U.S. Cl.
CPC ............. *B30B 15/144* (2013.01); *A47J 31/42* (2013.01); *A47J 31/44* (2013.01); *A47J 31/4464* (2013.01); *A47J 42/40* (2013.01); *B30B 15/06* (2013.01); *A47J 31/0657* (2013.01)

(58) Field of Classification Search
CPC ................ A47J 31/4464; A47J 31/0657; A47J 31/0663; A47J 31/3609; A47J 31/0626; A47J 31/42
USPC ...... 99/287, 286, 302 R, 280, 281, 282, 283
See application file for complete search history.

(56) References Cited

U.S. PATENT DOCUMENTS

| | | | | |
|---|---|---|---|---|
| 4,787,299 A | * | 11/1988 | Levi ..................... | A47J 31/0657 99/285 |
| 5,463,933 A | * | 11/1995 | Landais .............. | A47J 31/0657 99/285 |
| 5,642,656 A | * | 7/1997 | Braendle ............. | A47J 31/0663 99/295 |
| 5,870,943 A | * | 2/1999 | Levi .................... | A47J 31/0647 99/287 |

* cited by examiner

*Primary Examiner* — Reginald L Alexander
(74) *Attorney, Agent, or Firm* — Molins & Co. Pty. Ltd.

(57) ABSTRACT

A compacting auger for ground coffee has an automatic cut off that responds to either timing signals or to the torque resistance to the augur offered by the coffee that has been compacted. The automation of the cut off increases the consistency of compaction and reduces the amount of skill required to compact ground coffee for making espresso.

16 Claims, 10 Drawing Sheets

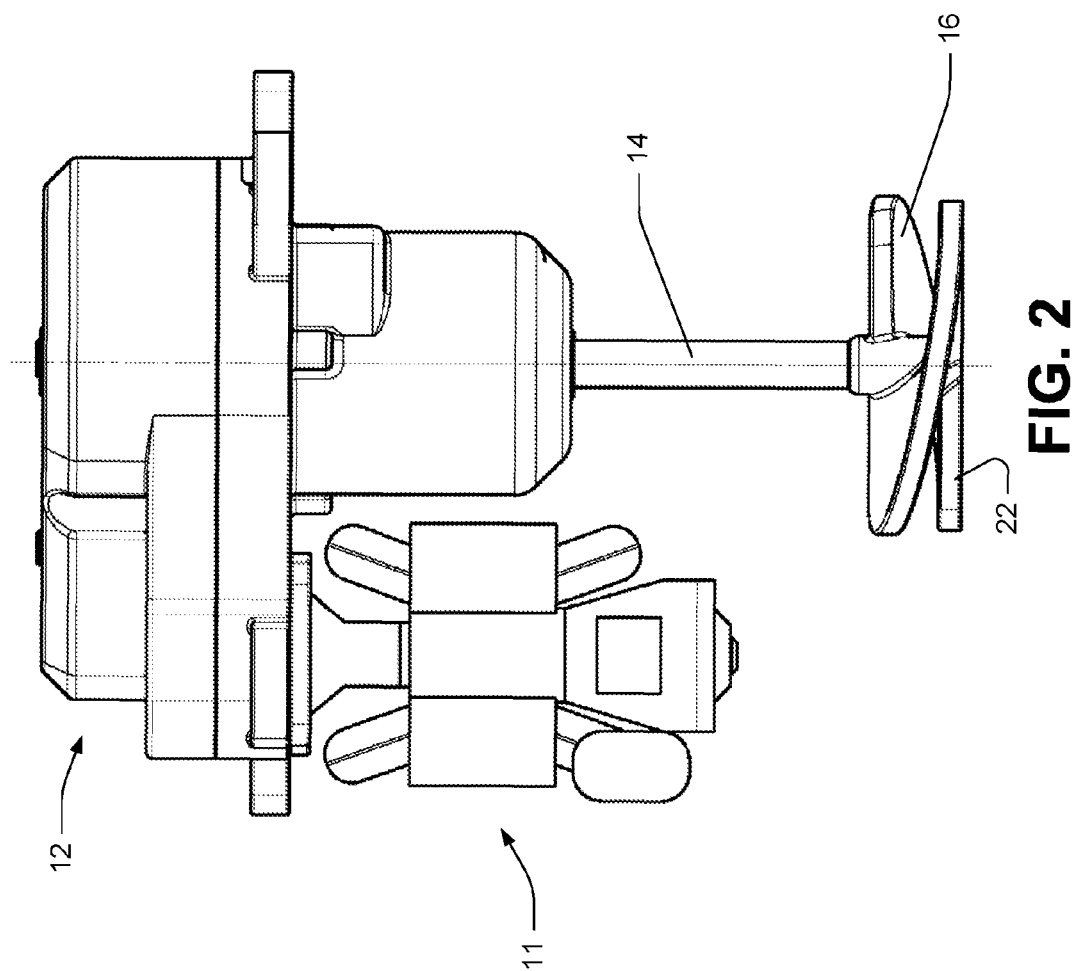

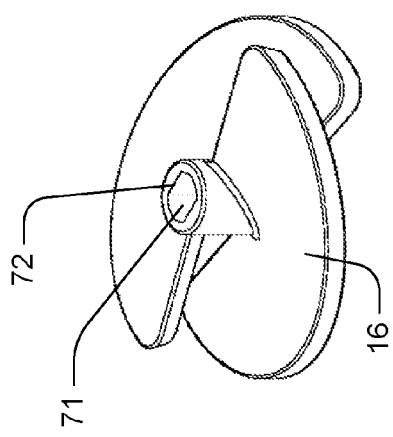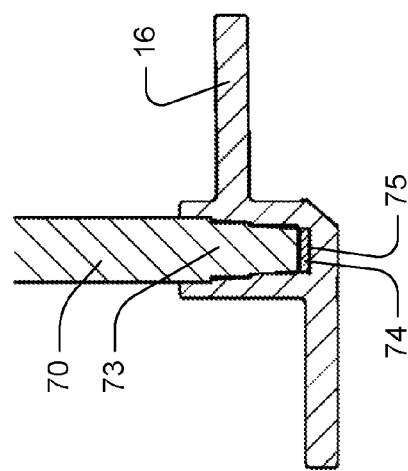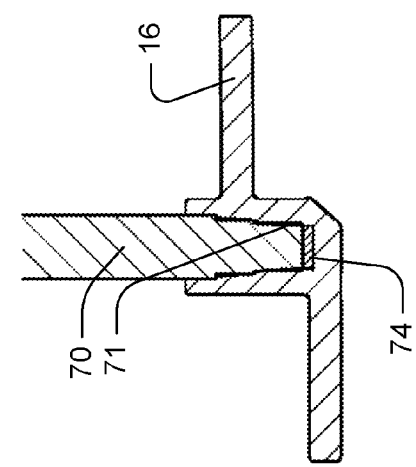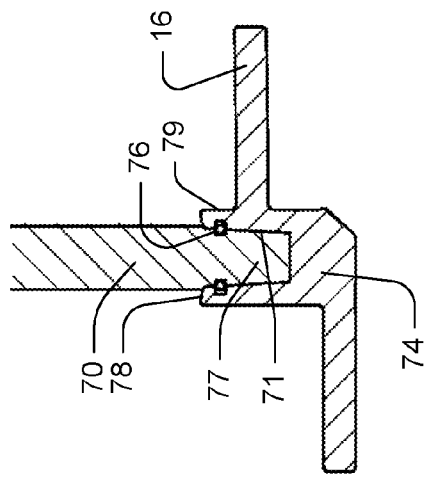

TAMPING AUGUR

FIELD OF THE INVENTION

The invention relates to devices for Espresso tamping and more particularly to a motorised tamping augur.

BACKGROUND OF THE INVENTION

Espresso coffee is made by passing hot water, under pressure, through compressed coffee grounds. Conventionally, the coffee grounds are carried in a filter equipped with a handle, referred to as a portafilter. In order to improve the flavour of the coffee by retarding the flow of hot water through the grounds, the grounds are compacted or compressed into the portafilter or a removable filter basket carried by the portafilter. Most often, this compaction of the ground coffee is done with a manual tamping device. The manual tamper compacts the grounds and creates a smooth upper surface. Compression of the body or puck of ground coffee in the portafilter is important to prevent cracks or fissures from developing in the ground coffee. Such cracks could allow hot water to travel through the portafilter without sufficient contact with the grounds.

The compression of the grounds in the portafilter can also be accomplished with an augur. One type of augur is seen in U.S. Pat. No. 6,095,032. The present invention provides a different compaction mechanism and an alternative shut off mechanism.

OBJECT AND SUMMARY OF THE INVENTION

It is the object of the invention to provide a motorised compaction augur for ground coffee, the augur mechanism having an automatic cut off that responds to timing signals or to the torque resistance to the augur offered by the compacted coffee.

BRIEF DESCRIPTION OF THE DRAWING FIGURES

A preferred embodiment of the invention will now be described, by way of example only, with reference to the accompanying drawings in which:

FIG. 2 is a side elevation of the motorised augur depicted in FIG. 1;

FIG. 7 is a cross section through a lower end of a shaft and an augur head;

FIG. 7a is a perspective view of a removable, helical, auger head;

FIG. 8 is a cross section of a second embodiment of a removable, helical, auger head, and a lower end of a shaft and an augur head;

FIG. 9 is a third embodiment of a removable, helical, auger head;

BEST MODE AND OTHER EMBODIMENTS OF THE INVENTION

Figure 1:
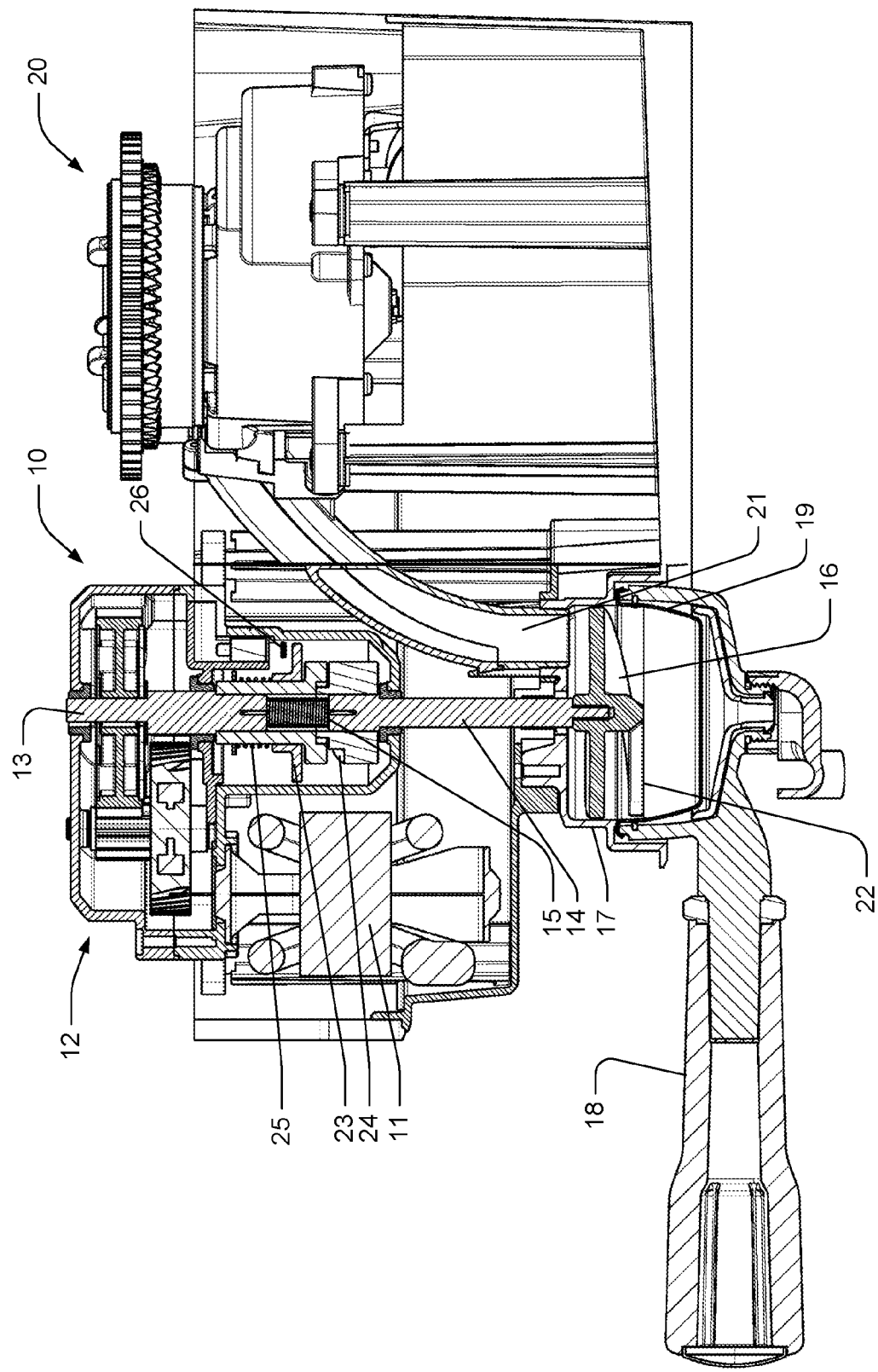
FIG. 1 is a cross section of a motorised compaction augur also illustrating the coffee chute leading from the coffee grinder.

As shown in FIG. 1, a motorised compaction augur for espresso coffee machine 10 comprises an electric motor 11 and gear train assembly 12 that are used to rotate an upper or gear shaft 13. The upper shaft 13 is connected to the lower augur shaft 14 by a spring coupling 15. The upper end of the spring coupling 15 is attached to the upper or gear shaft 13 and the lower end of the spring coupling 15 is attached to the augur shaft 14. The spring coupling 15 allows the gear shaft 13 and augur shaft 14 to rotate relative to one another after a pre-established torque limit has been reached. The instant specification discloses various mechanisms for using the angular displacement between the upper and lower shafts of the auger to achieve a useful outcome, indicate a level of compaction, perform switching functions, etc. The augur device may optionally be contained in the body of the grinder or coffee making apparatus in which it is fitted, thus containing grounds and creating less mess for the user. The device disclosed here also provides uniformity in coffee dose and tamp or compression force.

The lower end of the augur shaft carries a double helical augur head 16. The augur head 16 is generally above and within a portafilter holder 17. The portafilter holder is adapted to retain and release the portafilter assembly 18 in the same way that the portafilter is held and released by the group head of an espresso machine. The diameter of the augur head 16 is about the same as the inside diameter of the upper extremity of the portafilter interior, or the filter basket 19 carried by the portafilter 18.

In preferred embodiments, the motorised augur is adjacent to, below or at least co-operates with a coffee grinder 20. In this example, the grinder 20 is a stainless steel conical burr grinder. The grinder 20 discharges ground coffee directly, or into a delivery chute 21 having an exit opening above the augur head 16.

Coffee discharged by the grinder 20 flows through the helical structure of the augur head 16. The ground coffee is thus deposited through the auger and, in this way, fills the portafilter or filter basket from the bottom up. There is no friction or resistance between the ground coffee and the augur head until the fill level within the filter basket reaches the lower, generally flat surface 22 of the augur head. Once the fill level within the filter basket reaches the under side of the augur head 22, the addition of coffee grounds results in a compaction of the coffee in the filter basket or portafilter, that is below the lower surface of the augur head 22. At first, the frictional resistance of the coffee against the underside of the augur head is negligible. However, as ground coffee continues to fill the filter basket the resistance to the rotation of the augur head increases. At some point, the tortional resistance imposed by the spring coupling 15 is overcome and the upper or gear shaft 13 begins to move away from or become rotationally displaced from the augur or lower shaft 14. That is to say, for a given number of revolutions of the motor, the gear shaft 13 rotates slightly more than the augur shaft 14.

Figure 5:
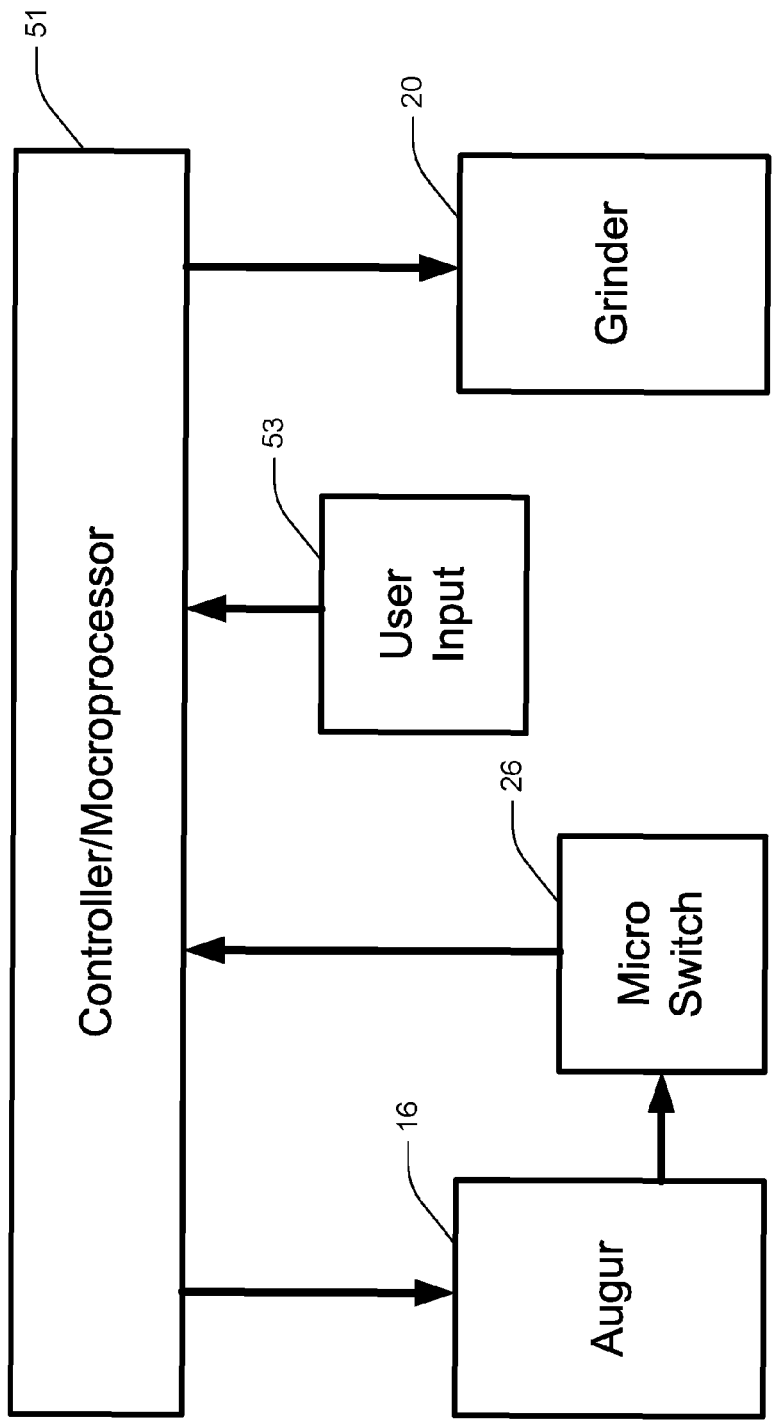
FIG. 5 is a schematic diagram of a motorised augur that controls a grinder via a micro switch and controller.
Figure 6:
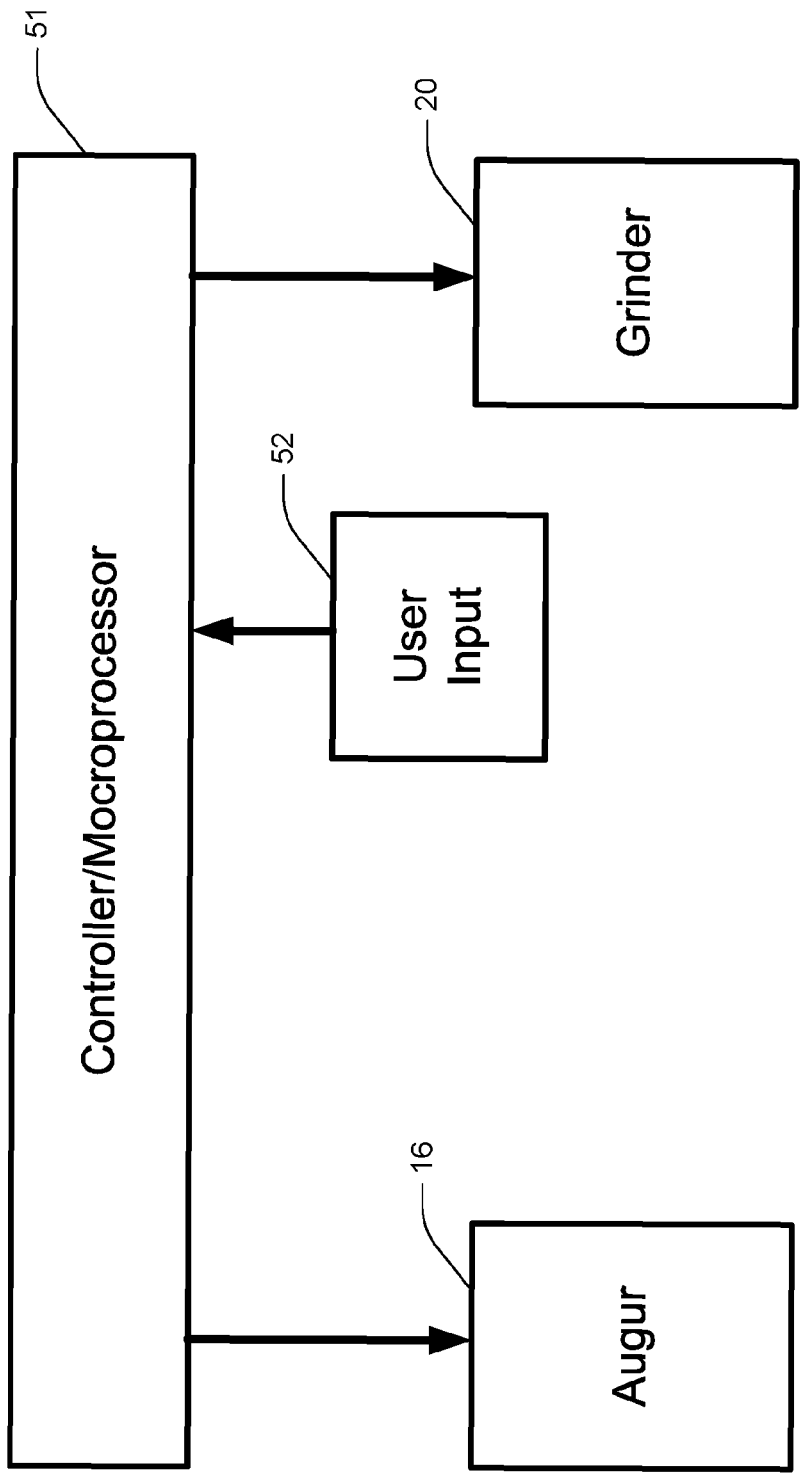
FIG. 6 is a schematic diagram illustrating an augur and grinder arrangement that does not require a micro switch that is responsive to vertical shaft movement.

This rotational or angular displacement between the gear shaft 13 and the augur shaft 14 causes a cam follower 23 that follows a circumferential cam 24 to lift or rise, or move away from the cam against a restoring force exerted by a cam lifter spring 25. As the friction against the underside of the augur increases, the cam follower 23 rises until its flange or lip impinges on the mechanical contact of a mechanism, switch or micro switch 26 or other switching means. As suggested in FIG. 5, the switch or micro switch or other mechanism 26, generally via a microprocessor or other controller 51, stops the action of the grinder's electric motor 11 and the grinder 20 stops producing grounds. After the grinder has stopped for a pre-established interval, the unit's timer or microprocessor causes the augur 16 to stop. This delay insures that delivery of coffee to the portafilter from the chute has stopped and that the top surface of the grounds in the portafilter is smooth. In the alternative, as suggested by FIG. 6, the electric motorised grinder 20 can be controlled so that it stops after a user selected interval passes from when the microswitch has been contacted. A user activated knob, dial or other selector 53 on the exterior of the grinder or coffee maker can thus be used (in conjunction with a timer or microcontroller etc.) to change the delay interval related to the grinder motor. This will cause additional grinds to be delivered, in ever increasing amount in relation to the delay. This allows the user to vary the dose and therefore the strength of the coffee delivered from the portafilter. In yet another embodiment (see FIG. 6), the cut off of the grinder motor is done based solely on a pre-set or user selected time interval 52 and thus no torque sensitive mechanism is required on the augur.

As shown in FIG. 2, the augur head 16 comprises one or two or more helical ramps or screws having a flat underside 22 in the area of the trailing edge or edges.

Figure 3:
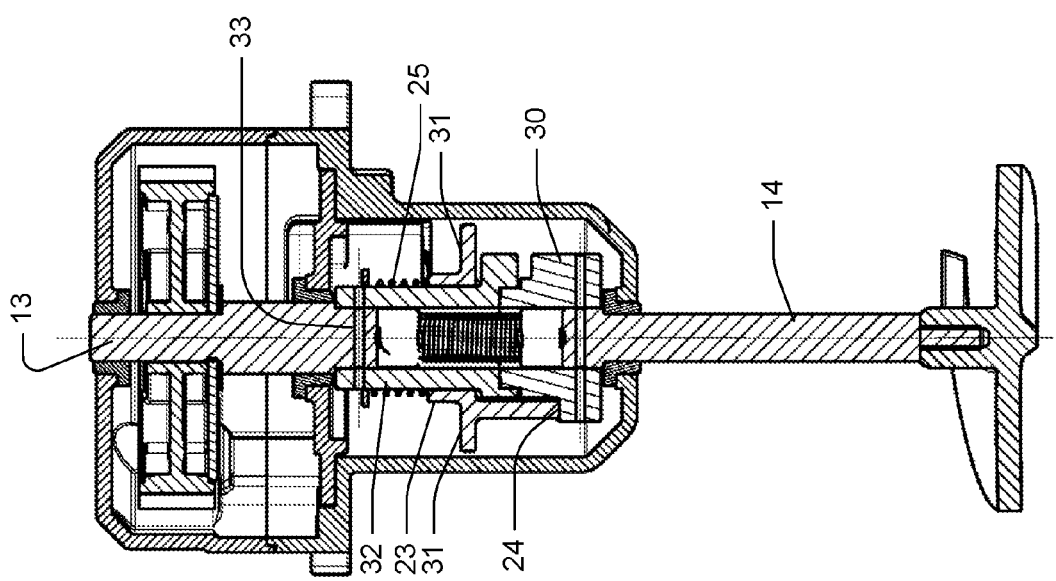
FIG. 3 is a cross section of the cut-off mechanism depicted in FIG. 2.

As shown in FIG. 3, the augur shaft 14 may retain a circumferential or other cam 30. The cam presents an upward facing constant radius or other cam surface 24 that essentially spirals around the central axis of rotation of the augur shaft 14. The cam lifter 23 and its integral activation flange 31 are carried on a coupling sleeve 32 that is affixed to the gear shaft 13. A compression spring 25 is, in this example, carried around the coupling sleeve and interposed between the cam lifter and a through pin or other fastener 33 that is used to attach the coupling sleeve 32 to the gear shaft 13.

Figure 4:
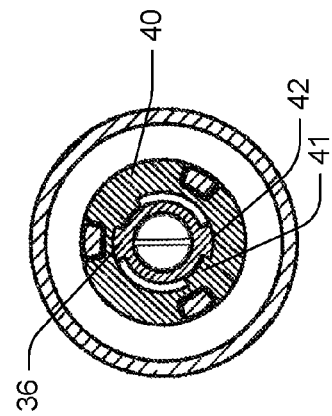
FIG. 4 is a cross section through the torque sensitive clutch depicted in FIGS. 1-3.

As shown in FIG. 4, the relative angular or tortional displacement between the gear shaft 13 and the augur shaft 14 is limited to about 90° of rotation. That is, regardless of the degree of compaction of the coffee grounds, once the gear shaft 13 and augur shaft 14 are displaced by about 90°, they will then continue to rotate together. This is done by providing a recess in the lower end of the coupling sleeve 32 that is adapted to receive an upper shoulder 36 of the cam 30 that is carried by the augur shaft 14. The lower end of the coupling sleeve 40 has internal abutments 41 that limit the rotation of the coupling 30 relative to the coupling sleeve 32. Protrusions 42 on the cam interfere with the abutments 41 after the pre-established degree of rotational displacement have been reached.

As suggested by FIGS. 1-3, the helical augur head 16 is removably attached to the lowest end of a rotating shaft 70. The augur head 16 must be retained on the shaft against the force of gravity. The august head 16 must also be resistant to rotating relative to the shaft 70. As shown in FIG. 7A, relative rotation between the augur head 16 and the shaft 70 may be accomplished by providing the central bore 71 of the augur head 16 with one or more flat sides 72 that cooperate with flat surfaces on the lower end 73 of the shaft 70. As suggested by FIG. 7, the augur head 16 is retained against the influence of gravity by a magnet 74 permanently affixed to the bottom 75 of the central bore 71. In this way, the augur head 16 can be easily inserted over the shaft 70 and easily removed for cleaning or storage. In the alternative, and as shown in FIG. 8, the magnet 74 may alternately be attached to the lower end surface of the shaft 70. In this example, the augur head must be fabricated from steel. In the example of FIG. 7, the augur head may be made from practically any suitable polymer or metal so long as the shaft 70 is fabricated from steel.

As shown in FIG. 9, the augur head 16 may be removably attached by way of a split ring or spring ring 76. The split ring 76 is located in a first groove and cooperates with a second groove. The first groove may be in either the outer circumference of the shaft 70 or the inner surface of the bore 71. The complimentary second groove receives the ring 76. In this arrangement, it is preferred that the tip of the shaft 77, below the ring 76 be tapered and received by a complimentary taper in the bore 71. In some embodiments, an upper surface 78 of the hub 79 of the augur 16 is piloted to assist with location of the tip 77 into the bore 71.

Figure 10:
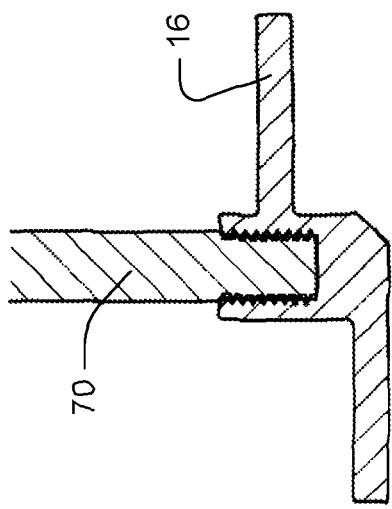
FIG. 10 is a cross section of a fourth embodiment of a removable, helical, auger head.
Figure 11A:
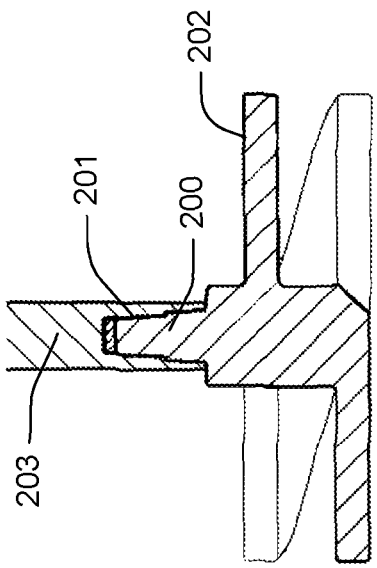
FIG. 11a is a cross section of a sixth embodiment of a removable, helical, auger head.

As shown in FIG. 10, the augur head 16 may be retained on the shaft 70 by cooperating reverse threads. In this way, friction between the augur and the coffee results in a tightening rather than loosening of the head 16.

Figure 11:
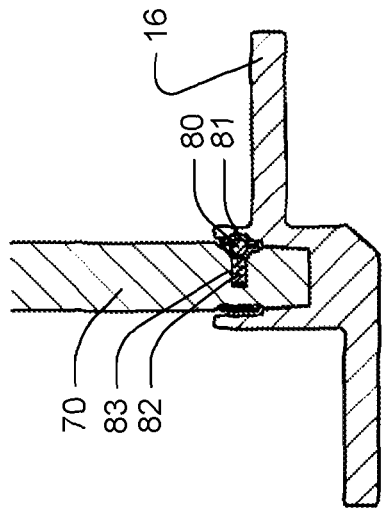
FIG. 11 is a cross section of a fifth embodiment of a removable, helical, auger head.

In another embodiment, and as shown in FIG. 11, the augur head 16 is retained on the shaft 70 by way of a captive ball that cooperates with a cooperating detent 81. The ball 80 is urged by a spring 82 toward the detent 81. It should be noted that the ball may be located within a radially oriented recess 83 and that the recess may be formed in either the shaft 70 or the head 16. The detent 81, in the form of a pocket or circumferential groove is located on the other component. FIG. 11 a illustrates than in any of the embodiments relating to the attachment of the auger head 202 to the shaft 203, the auger may carry the male coupling component 200 and the shaft may carry the bore or female coupling component 201.

Figures 12, 13:
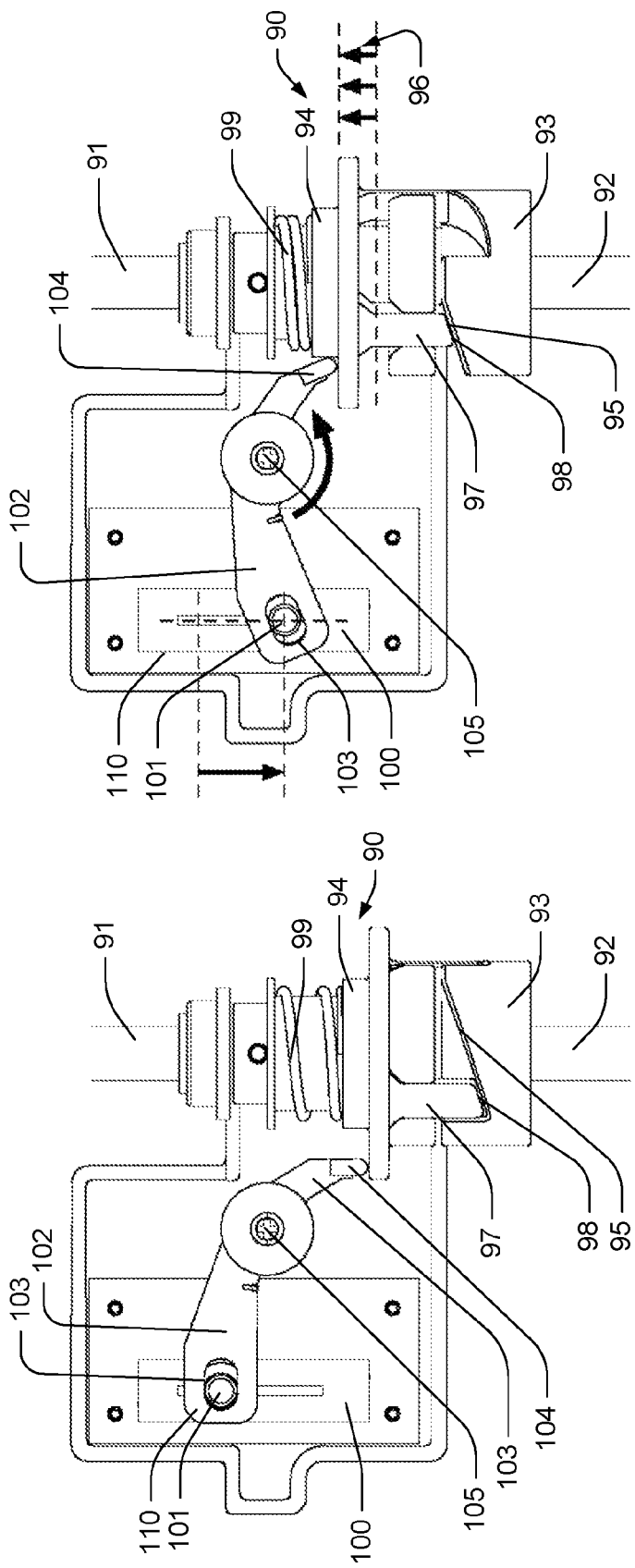
FIG. 12 is a side elevation of a coupling arrangement and linear potentiometer mechanism for measuring torque on an augur head.
FIG. 13 is a side elevation illustrating the coupling and linear potentiometer when the augur head is working.

As shown in FIGS. 12 and 13, a coupling arrangement 90 between two adjacent portions of the rotating augur shaft 91, 92 can be used to measure the instantaneous torque or resistance to rotation exhibited by the ground coffee on the augur head and its shaft 92. The coupling arrangement 90 consists of a lower hub or cam 93 and an upper hub or cam follower 94. A periphery of the lower hub 93 is provided with one or more similar ramps 95. When the rotation of the lower hub 93 is resisted by the action of the augur head on the ground coffee below it, the upper hub becomes displaced vertically upward 96, moving away from the cam or lower hub (as shown in FIG. 13). This is because the upper hub 94 has one or more vertically extending fingers 97. The fingers 97 have optionally lower inclined surfaces 98 that cooperate with the ramps 95. As the lower hub 93 is not able to move vertically, the upper hub rises or moves 96 against the action of a compression spring 99. Thus, the amount of vertical (or other) motion 96 is proportional to or representative of the aforementioned resistance or torque exerted on the auger head and its lower shaft 92. The amount of vertical motion 96 is measured by a mechanism, sensor mechanism or an instrument or potentiometer such as a linear potentiometer 100. The vertical motion 96 of the upper hub 94 is transmitted to the vertical slider 101 of the sensor or potentiometer 100 by a lever 102. The lever has a first end 103 comprising a wear resistant terminal portion 104. The lever 102 has an intermediate pivot 105. Thus, the vertical motion 96 of the upper hub 94 is transmitted by the lever 102 into a linear motion of the potentiometer's slider 101. The other end 110 of the lever 102 comprises an elongated slot 103a so that only the vertical motion of the end 110 is transmitted to the slider 101. The motion of the lever may be measured or detected in other ways and the motion may be used to activate a switch, sensor or mechanism for achieving a useful purpose in an auger or grinder.

Figure 14:
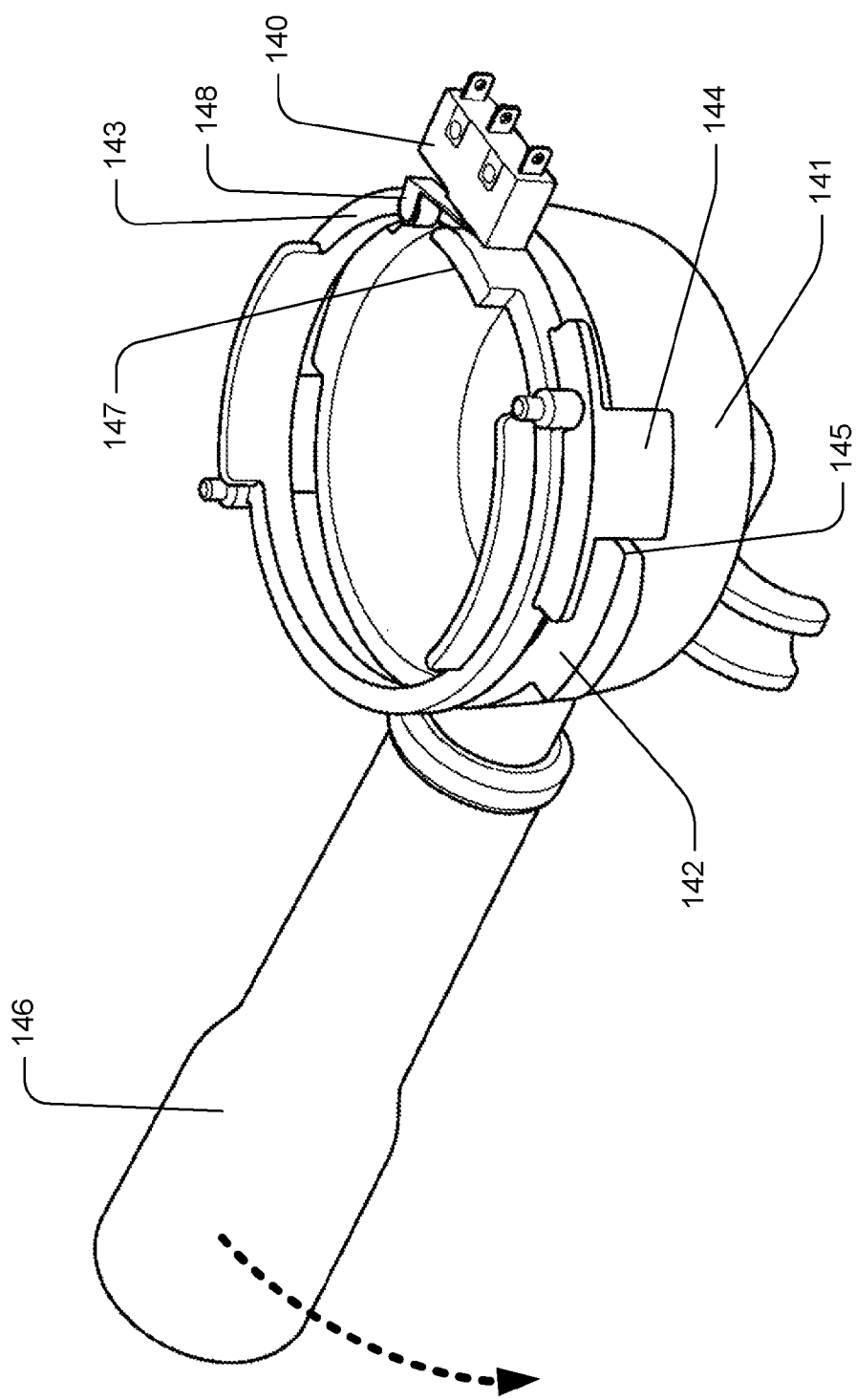
FIG. 14 is a perspective view of portafilter activated switch for turning on an augur.

As shown in FIG. 14, a switch or micro switch 140 may be used to initiate the action of the motorised auger. In this example, the portafilter 141 has an upper rim on which is formed one or more outwardly extending tabs 142. These tabs are inserted into co-operating slots in the female component of a bayonet mechanism that holds the portafilter during coffee extraction. In this example, an intermediate ring 143 has one or more integral bumpers 144. After the initial insertion of the portafilter into the female bayonet component, rotation of the handle, generally in a anti-clockwise motion (when seen from above) causes the front edge 145 of a tab 142 to contact a trailing edge of a bumper 144. Further rotation of the portafilter handle 146 causes a rotation of the ring 143. The ring has an activation tab 147 when the ring is rotated, the leading edge of the activation tab 147 depresses the mechanical contact 148 of the micro switch 140. The subsequent or electrical contact within the micro switch 140 is used by the device's microprocessor to initiate the action of the auger.

Figure 15:
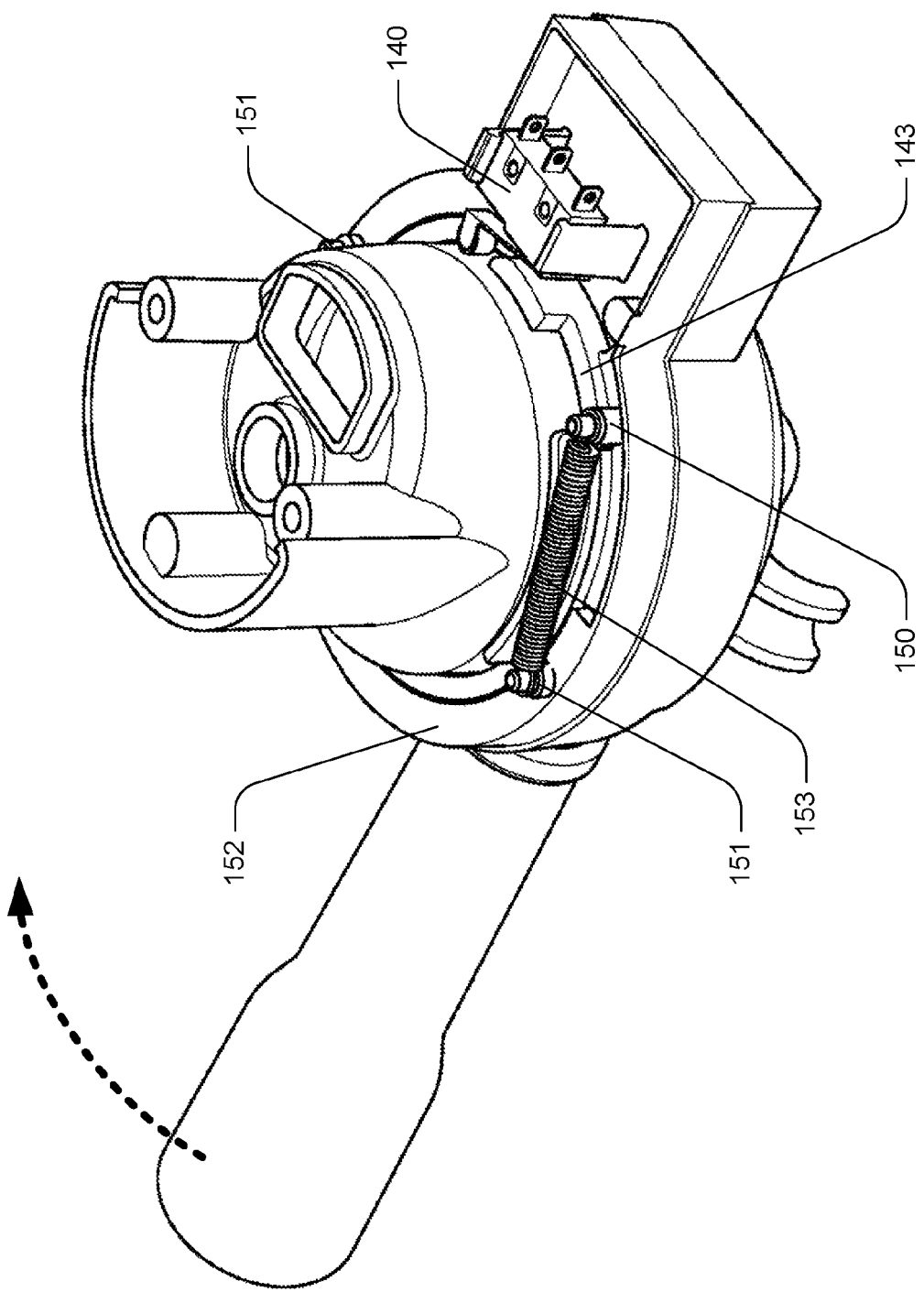
FIG. 15 is a perspective view of the device depicted in FIG. 14 with an external housing.

As shown in FIG. 15, the intermediate ring 143 has fixing posts, in this example one or more vertical fixing posts 150. A co-operating fixing post 151 is located on a housing 152 or otherwise adjacent to but not connected to the ring 143. A tension spring 153 extends between the two posts 150, 151. Accordingly, when the portafilter handle is rotated back to its initial position, the retraction of the spring 153 returns the rotating ring 143 to its initial position. The intermediate ring 143 allows the micro switch 140 to be mechanically isolated from ground coffee that is being transported by the portafilter. It would be appreciated that various spring arrangements between the intermediate ring and any adjacent structure may be used to anchor the ends of a resilient spring or other bias member to accomplish the return action of the intermediate ring. In other embodiments, the tabs 142 of the portafilter make contact the switch or micro switch 140 in other ways including direct contact or contact through a flexible membrane (not shown).

While the present invention has been disclosed with reference to particular details of construction, these should be understood as having been provided by a way of example and not as limitations to the scope of the invention.

What is claimed is:

1. A motorised tamping auger device for a portafilter having outwardly extending portafilter tabs, the device comprising:
    a motorised tamping auger;
    an electrical switch;
    a intermediate rotating ring that rotates between an initial first configuration and a second configuration; the intermediate rotating ring bring biased toward the first configuration; the intermediate rotating ring having a bumper for making contact with a portafilter tab; the rotating ring having an activation tab that selectively acts on the electrical switch; and
    wherein rotation motion of the portafilter causes the portafilter tab to engage the bumper and rotate the intermediate rotating ring toward the second configuration, such that the activation tab is rotated to act on the electrical switch for controlling the motorised tamping auger.

2. The device of claim 1, wherein the intermediate rotating ring mechanically isolates the electrical switch from coffee transported by the portafiller.

3. The device of claim 1, wherein a spring extends between the ring and a housing adjacent to the ring, and the spring returning the ring to the initial first configuration from which it was rotated.

4. The device of claim 3, wherein the spring is attached to the ring at a first post located on the ring, and the spring is attached to a second post located on the housing.

5. The device of claim 1, further comprising:
    a processor that co-operates with the switch to initiate the tamping auger in response to the switch.

6. The device of claim 5, wherein the ring mechanically isolates the electrical switch from coffee transported by the portafiller.

7. The device of claim 6, wherein a spring extends between the ring and a housing adjacent to the ring, and the spring returning the ring to the initial first configuration from which it was rotated.

8. The device of claim 7, wherein the spring is attached to the ring at a first post located on the ring, and the spring is attached to a second post located on the housing.

9. The device according to claim 1, the motorised tamping auger further including:
    an electric auger motor driving a first shaft, the first shaft connected to a second shaft by a coupling; the second shaft having at a lower end, an auger head; and
    an angular displacement between the first shaft and the second shaft causing activation of a mechanism for indicating when the compaction is complete.

10. The device according to claim 9, wherein:
    a motorised coffee grinder discharges above the auger head and;
    a timer initiated by the mechanism delays the stopping of the action of the auger motor after the stopping of a motor of a coffee grinder that has also stopped in response to the activation of the mechanism.

11. The device according to claim 9, wherein action of the portafilter, actuates the electrical switch to start the device.

12. The device according to claim 9, the device further including:
    a user activated time interval selector, wherein
    a stopping of the auger motor occurs after a user selected time interval.

13. The device according to claim 9, wherein the mechanism is used to stop a motor of a coffee grinder.

14. The device according to claim 9, wherein a user specified dosage delay occurs between the activation of the mechanism and a stopping of the motor of the coffee grinder.

15. The device according to claim 9, wherein a compaction delay occurs between the activation of the mechanism and a stopping of the auger motor.

16. The device according to claim 1, wherein:
    the motorised tamping auger includes an electric auger motor driving a first shaft, the first shaft connected to a second shaft by a coupling; the second shaft having at a lower end, an auger head; and an angular displacement between the first shaft and the second shaft causing activation of a mechanism for indicating when the compaction is complete; and a motorised coffee grinder discharges above the auger head; and the electrical switch that can be activated by the action of a portafilter, the electrical switch being used to start the device;

the mechanism is used to stop a motor of a coffee grinder; and a timer initiated by the mechanism delays the stopping of the action of the auger motor after the stopping of a motor of a coffee grinder that has also stopped in response to the activation of the mechanism.

* * * * *